(12) United States Patent
Hartjen, III

(10) Patent No.: US 8,651,209 B2
(45) Date of Patent: Feb. 18, 2014

(54) KINETIC ENERGY STORAGE SYSTEMS AND METHODS OF USE

(75) Inventor: Raymond Hartjen, III, Pleasanton, CA (US)

(73) Assignee: Sony Corporation, Tokyo (JP)

(*) Notice: Subject to any disclaimer, the term of this patent is extended or adjusted under 35 U.S.C. 154(b) by 420 days.

(21) Appl. No.: 12/973,698

(22) Filed: Dec. 20, 2010

(65) Prior Publication Data

US 2012/0152635 A1     Jun. 21, 2012

(51) Int. Cl.
*B60W 10/26*     (2006.01)

(52) U.S. Cl.
USPC ..................................... 180/65.29; 180/65.31

(58) Field of Classification Search
USPC .......................................... 180/65.29, 65.285
See application file for complete search history.

(56) References Cited

U.S. PATENT DOCUMENTS

| | | | | |
|---|---|---|---|---|
| 3,719,881 A * | 3/1973 | Shibata et al. | ................... | 322/11 |
| 6,048,289 A * | 4/2000 | Hattori et al. | ................... | 477/15 |
| 6,114,775 A * | 9/2000 | Chung et al. | ................. | 307/10.1 |
| 6,621,244 B1 * | 9/2003 | Kiyomiya et al. | ........... | 318/611 |
| 6,949,897 B2 * | 9/2005 | Wakashiro et al. | ........... | 318/139 |
| 7,533,746 B2 * | 5/2009 | Yamaguchi | ................ | 180/65.29 |
| 7,813,848 B2 * | 10/2010 | Seo et al. | ......................... | 701/22 |
| 7,823,668 B2 * | 11/2010 | Ogata et al. | .............. | 180/65.265 |
| 7,896,114 B2 * | 3/2011 | Colvin et al. | .............. | 180/65.28 |
| 7,909,123 B2 * | 3/2011 | Ebuchi et al. | ............ | 180/65.235 |
| 7,941,254 B2 * | 5/2011 | Mitsutani | ......................... | 701/22 |
| 8,020,652 B2 * | 9/2011 | Bryan et al. | ............. | 180/65.285 |
| 8,025,115 B2 * | 9/2011 | King et al. | ............... | 180/65.275 |
| 8,125,181 B2 * | 2/2012 | Gregg et al. | ................... | 320/104 |
| 8,219,248 B2 * | 7/2012 | Aridome et al. | .............. | 700/275 |
| 8,242,627 B2 * | 8/2012 | Ichikawa | ...................... | 307/10.1 |
| 2009/0039656 A1 | 2/2009 | Farley et al. | | |
| 2012/0049792 A1 * | 3/2012 | Crombez | ...................... | 320/109 |

OTHER PUBLICATIONS

"Energy Recovery Systems With Feedback to The Grid", Ingeteam, www.ingeteam.com, Sep. 2008, 2 pages.
Kevin Bullis, "Subway Trains to Generate Power for the Grid", Technology Published by Mit India Edition Review, Sep. 10, 2010, 5 Pages.
Christopher Lampton, "How Regenerative Breaking Works", www.howstuffworks.com, Dec. 19, 2010, 5 pages.
Karim Nice and Julia Layton, "How Hybrid Cars Work", www.howstuffworks.com Dec. 19, 2010, 10 pages.
"Hybrid Vehicle", www.wikipedia.com, Dec. 13, 2010, 15 pages.
"Regenerative Brake", www.wikipedia.com, Dec. 15, 2010, 8 pages.

* cited by examiner

*Primary Examiner* — Jeffrey J Restifo
(74) *Attorney, Agent, or Firm* — John L. Rogitz

(57) ABSTRACT

Embodiments of the present technology are directed toward a kinetic energy storage system for capturing kinetic energy of a vehicle, converting the captured kinetic energy into another form, and storing the converted energy in a portable energy storage device.

14 Claims, 3 Drawing Sheets

KINETIC ENERGY STORAGE SYSTEMS AND METHODS OF USE

BACKGROUND OF THE INVENTION

FIG. 1 shows an exemplary vehicle including a regenerative breaking system according to the conventional art. The vehicle 100 includes an engine 110, a transmission 120, a motor/generator 130, and one or more vehicle batteries 140. It is appreciated, that the vehicle also includes numerous other conventional subsystems not shown. The engine 110 and motor/generator 130 may be coupled to the transmission 120 in a parallel hybrid, series hybrid, series-parallel hybrid, full hybrid, or the like mild hybrid. The exemplary vehicle 100 illustrates an electric-internal combustion engine hybrid vehicle. However there are other conventional hybrid vehicles, such as electric-fuel cell hybrids, internal combustion engine-hydraulic hybrids, internal combustion engine-pneumatic hybrids, or the like.

The vehicle 100 includes a regenerative breaking system 150 that captures the kinetic energy of the vehicle 100 during breaking and converts the kinetic energy to electrical energy for storage on batteries 140, supercapacitors and/or the like. Conventional systems may also capture excess kinetic energy of the engine 110. Conventional systems may alternatively store the captured kinetic energy in another form in a flywheel, hydraulic accumulator, or the like of the vehicle. The recaptured energy is then used again to propel the vehicle 100.

For example, in an electric-internal combustion engine series-parallel hybrid with regenerative breaking, the vehicle 100 can be propelled by the engine 110, the motor/generator 130, or a combination thereof. The electric motor of the vehicle 100 becomes a generator to recover kinetic energy of the vehicle during breaking. The captured kinetic energy is converted into electric energy to recharge the batteries 140 by the generator.

The regenerative breaking system 150 of the vehicle 100 reduces the power consumed by the vehicle 100 and emissions produced by the vehicle 100. However, there is a continued need for improved kinetic energy capture systems and method of use.

SUMMARY OF THE INVENTION

The present technology may best be understood by referring to the following description and accompanying drawings that are used to illustrate embodiments of the present technology that are directed toward kinetic energy storage systems and methods of use.

In one embodiment, kinetic energy of a vehicle is captured and converted to another form of energy. The kinetic energy may be captured from the motion of the vehicle, excess energy from an engine of the vehicle, and/or the like. The converted energy is stored in an energy storage device of the vehicle up to a rate of charge or a capacity of the energy storage device of the vehicle. The converted energy in excess of the rate of charge or the capacity of the energy storage device of the vehicle is stored in a portable energy storage device. The portable energy storage device may then be decoupled from the vehicle and thereafter coupled to another device. After coupling to the other device, the energy stored on the portable energy storage device may be used to power the other device.

In another embodiment, a system includes a vehicle and a portable energy storage device that is removably couplable to the vehicle. The vehicle includes a vehicle energy storage device and a kinetic energy capture system. The kinetic energy capture system captures and stores kinetic energy of the vehicle in the vehicle energy storage device up to a rate of charge or a capacity of the vehicle energy storage device. The kinetic energy capture system also captures and stores kinetic energy of the vehicle in the portable energy storage device in excess of the rate of charge or the capacity of the vehicle energy storage device.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Figure 1:
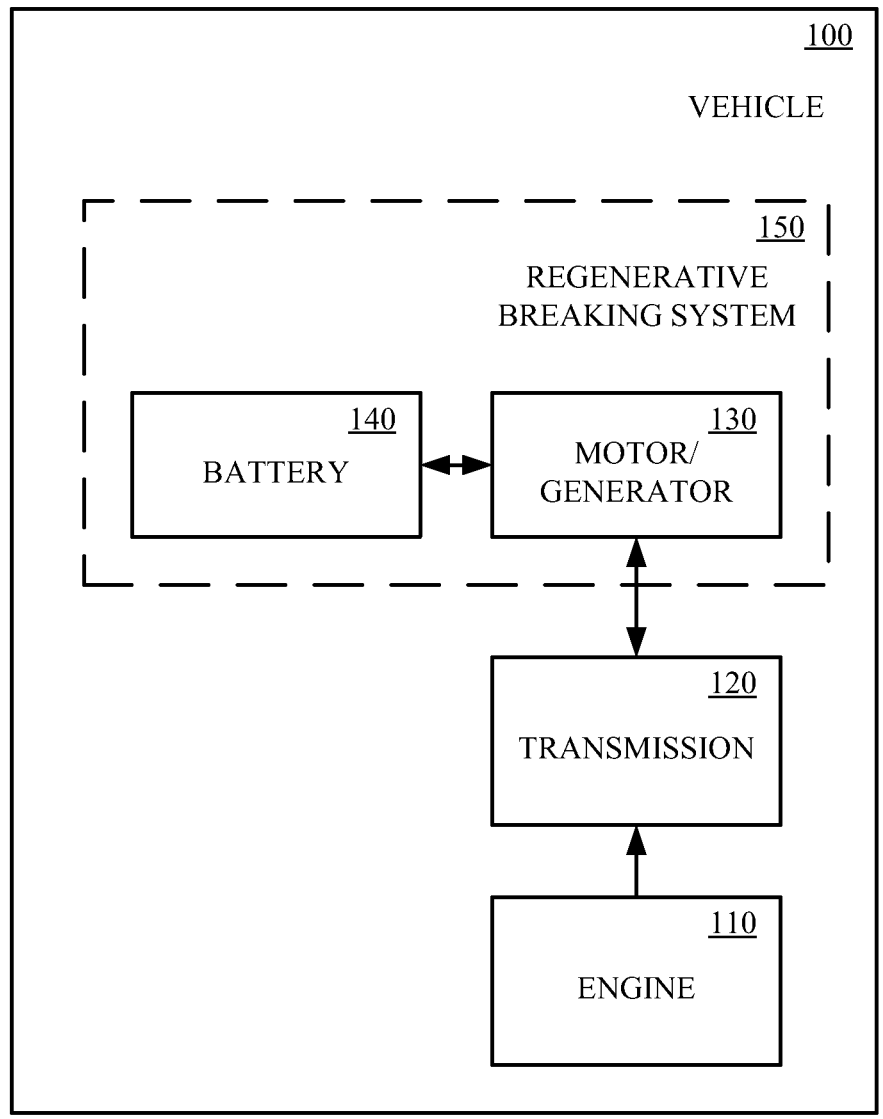
FIG. 1 shows a block diagram of an exemplary vehicle including a kinetic energy capture system according to the conventional art.
Figure 2:
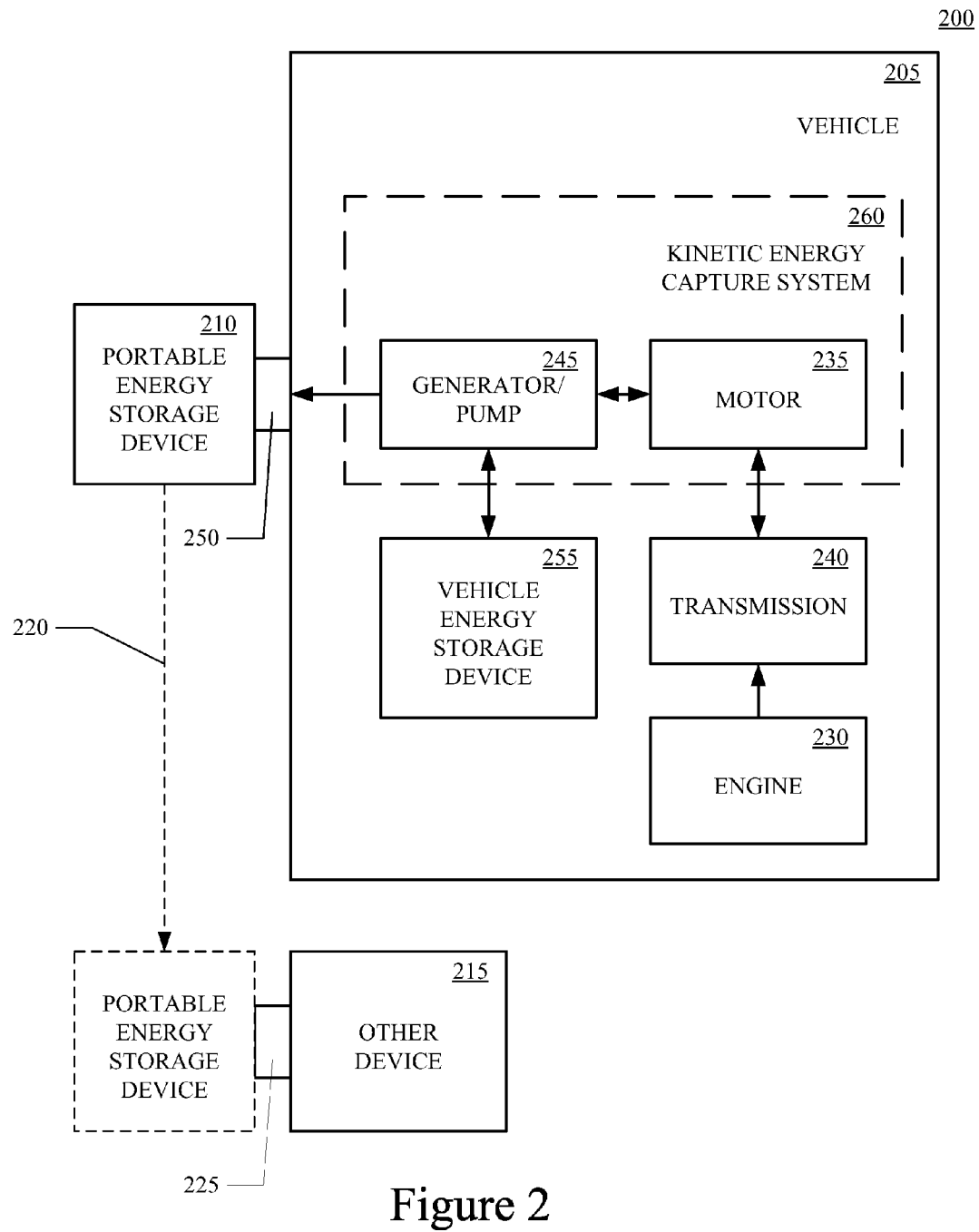
FIG. 2 shows a block diagram of a kinetic energy capture system, in accordance with one embodiment of the present technology.

Referring now to FIG. 2, a kinetic energy storage system, in accordance with one embodiment of the present technology, is shown. The kinetic energy storage system 200 includes a vehicle 205, one or more portable energy storage devices 210, and one or more other device 215. The one or more portable energy storage devices 210 may be removably couplable 220 to the vehicle 205 and the one or more other devices 215.

The other devices 215 may include any electronic devices, electromechanical devices, and/or power distribution systems. For example, the other devices 215 may include smart phones, digital music players (e.g., MP3 player), cordless power tools, home appliances, home power networks, utility power distribution grids, and/or the like. Each of the other devices 215 includes one or more portable energy storage device ports 225.

The vehicle 205 includes an engine 230 and/or motor 235, a transmission 240, generator or pump 245, and one or more portable energy storage device ports 250. The generator or pump 245 and the optional motor 235 are utilized in a kinetic energy capture system 260 of the vehicle 205. The vehicle 205 may also optionally include a one or more vehicle energy store devices 255. The term vehicle energy store device 255 refers herein to the energy store devices, such as batteries, conventionally used by the vehicle 205 and accessories of the vehicle. It is appreciated, that the vehicle 205 also includes numerous other conventional subsystems not shown that are not germane to an understanding of the present technology and therefore will not be discussed herein.

The generator or pump 245 and the optional motor 235 may be implemented as one or more separate subsystems. For example, the vehicle 205 may include a separate generator and motor or a separate pump and motor. Alternatively, the generator or pump 245 and the motor 235 may be implemented as an integrated subsystem such as a combined motor and generator. If the vehicle 205 includes a motor 235 and an engine 230, the engine 230, motor 235, and generator or pump 245 may be coupled to the transmission 240 in a parallel hybrid, series hybrid, series-parallel hybrid, full hybrid, mild hybrid, electric-internal combustion engine hybrid, electric-fuel cell hybrid, internal combustion engine-hydraulic hybrid, internal combustion engine-pneumatic hybrid, or the like configuration.

The kinetic energy capture system 260 captures the kinetic energy of the vehicle 205 during breaking (e.g., motion) and/or excess kinetic energy of the engine 230, and converts the kinetic energy into another form for storage in the one or more portable energy storage devices 210 and optionally one or more of the vehicle's energy storage devices 255. The portable energy storage devices 210 may be batteries, supercapacitors, a combination of one or more batteries and one or more supercapacitors, an accumulator, or the like. The vehicle energy storage devices 255 may similarly be electrical batteries, supercapacitors, a combination of one or more batteries and one or more supercapacitors, an accumulator, or the like. The recaptured energy in the one or more vehicle energy storage devices 255 then may be used again to propel the vehicle 205. The recaptured energy in the one or more portable energy storage devices 210 may be used to power the other devices 215.

The kinetic energy capture system 260 in one implementation converts kinetic energy of the vehicle into electric energy. For example, during breaking an electrical generator is used, in addition to the breaks, to slow the vehicle. The electrical generator, during breaking, converts the vehicle's kinetic energy into electrical energy. In another example, the engine 230 of the vehicle 205 may be used to drive the electrical generator, during periods such as idling, coasting or the like, to generate electrical energy. The electrical energy generated by the electrical generator is used for charging the batteries of the vehicle 205. The energy in the vehicle's batteries may then be transferred back to an electric motor to propel the vehicle.

In another implementation, the kinetic energy capture system 260 converts kinetic energy of the vehicle 205 into compressed gas or liquid. For example, during breaking a pump is used, in addition to the breaks, to slow the vehicle 205. The pump, during breaking, converts the vehicle's kinetic energy into compressed gas or liquid. In another example, the engine 230 of the vehicle 205 may be used to drive the pump, during periods such as idling, coasting or the like, to compress gas or liquid. The energy in the form of compressed gas or liquid generated by the pump is stored in a condenser. The energy in the vehicle's condenser may then be transferred back to a motor to propel the vehicle 205.

The vehicle's energy storage devices 255 have a finite rate of charging and a finite storing capacity. For example, during breaking a vehicle 205 typically generates electrical energy at a greater rate than the rate at which the vehicle's batteries can be charged. In addition, during normal operation, the vehicle's batteries are typically only partially discharged, and therefore there is only a small portion of the batteries capacity available to store electrical energy from regenerative breaking. In a conventional hybrid vehicle the energy generated by the regenerative breaking system in excess of the charging rate and/or capacity of the vehicle's batteries is wasted.

In embodiments of the present technology, the energy in excess of the charging rate and/or capacity of the vehicle's energy storage devices 255 is used to charge the one or more portable energy storage devices 210. Although embodiments of the present technology are described with reference to a vehicle 205 that captures energy for storage in the vehicle's energy storage devices 255 for reuse, it is appreciated that the vehicle 205 need not capture energy for storage in the vehicle's energy storage devices 255.

In the one implementation, the one or more portable energy storage devices 210 and/or the portable energy storage ports 250, 225 on the vehicle 205 and/or the other devices 214 include mating connectors and/or energy management subsystems. For example, the vehicle 205 may include one or more standardized and/or proprietary connectors for coupling to one or more different portable energy storage devices 210. In another example, the vehicle 205 may include a particular connector for coupling to a mating connector on a given portable energy storage device 210. An adapter may alternatively be used for coupling from the particular connector of the portable energy storage device port 225, 250 on the vehicle or other device 215 to a corresponding standardized and/or proprietary connector on a given portable energy storage device 210. For instance, the vehicle 205 may include one or more standardized connectors, one or more proprietary connectors, and/or one or more device specific connectors. The standardized connectors may be for coupling directly to mating standardized connectors on appropriate batteries. One device specific connector may be for a specific set of power tool batteries, while another device specific connector may be for a battery adapted to be coupled to a specific appliance. Another device specific connector may be for a battery designed to be coupled to a home's power network or a utility power distribution grid. An adapter may be used to couple a standardized connector or a proprietary connector to a device specific battery such as a smart phone battery, digital music player batter or the like. The other devices 215 may similarly include one or more standardized connectors, one or more proprietary connectors, and/or one or more device specific connectors.

In another example, the vehicle 205 may include an energy management charging subsystem and the other device 215 may include an energy management discharging subsystem, when necessary. In another example, the portable energy storage devices 210 may include the energy management charging and discharging subsystem, when necessary. In yet another example, the vehicle 205 may include the energy management charging subsystem and/or the portable energy storage device 210 may include the energy management discharging subsystem, when necessary. In yet another example, the portable energy storage device 210 may include the energy management charging subsystem and/or the other device 215 may include the energy management discharging subsystem, when necessary. For instance, the vehicle 205 may include a converter/rectifier to convert the alternating current potential from the generator to a direct current potential for charging the portable batteries. The batteries may include a voltage regulator to manage the discharge voltage of the batteries and a circuit to protect against short circuiting the battery. The other device 215 such as a home power network may in turn include an inverter to convert the direct current potential from the portable batteries to alternating current potential for use in offsetting the other device's draw from the utility power distribution grid. From the above example, it is appreciated that the energy management systems or portions thereof, if necessary, may be implemented in the portable energy storage devices 210, the portable energy storage device ports 225, 250, the vehicle, and/or the other devices.

Figure 3:
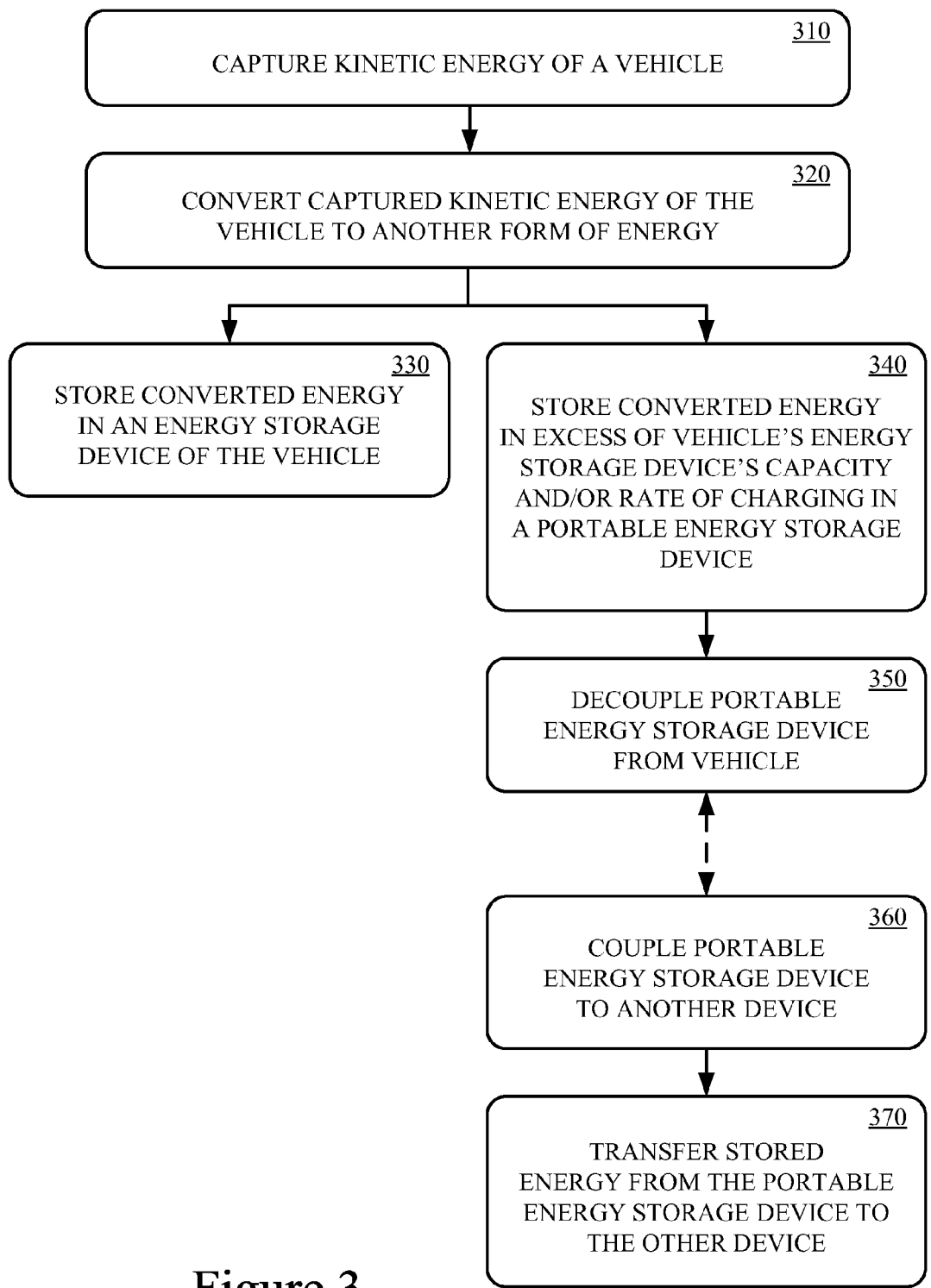
FIG. 3 shows a flow diagram of operation of the kinetic energy capture system and use of the energy from the kinetic energy capture system, in accordance with one embodiment of the present technology.

Operation of the kinetic energy storage system 200, in accordance with one embodiment of the present technology, will be further explained with reference to FIG. 3. At 310, the kinetic energy of the vehicle is captured. In one implementation, a generator or pump captures the kinetic energy of the vehicle's motion during breaking. In another implementation, the generator or pump captures excess kinetic energy of the engine when the vehicle is idling or coasting for example. At 320, the captured kinetic energy of the vehicle is converted to another energy form. In the one implementation, the kinetic energy is converted to electrical energy by the motor. In the other implementation, a pump converts the kinetic energy into compressed gas or liquid.

At 330, converted energy, up to the charging rate and/or capacity of the vehicle's one or more energy storage devices, is stored in the one or more energy storage devices of the vehicle. In the one implementation, the electrical energy from the generator, up to the charging rate and/or capacity of the vehicle's batteries, is stored in the vehicle's batteries. In the other implementation, the compressed gas or liquid generated by the pump, up to the charging rate and/or capacity of the vehicle's condenser, is stored in the vehicle's condenser. At 340, the converted energy in excess of the charging rate and/or capacity of the vehicle's one or more energy storage devices, is stored in the one or more portable energy storage devices. In the one implementation, the electric energy from the generator, in excess of the charging rate and/or capacity of the vehicle's batteries, is stored in one or more portable batteries. In the other implementation, the compressed gas or liquid generated by the pump, in excess of the vehicle's condenser charging rate and/or capacity, is stored in one or more portable condensers.

After converted energy is stored in the one or more portable energy storage devices, the one or more portable energy storage devices may be decoupled from the vehicle, at 350. At 360, one or more of the portable energy storage devices are coupled to one or more other devices, after decoupling from the vehicle. The other device may include, for example, smart phones, digital music players (e.g., MP3 player), cordless power tools, home appliances, home power networks, utility power distribution grids, and/or the like. After coupling the one or more portable energy storage devices to the one or more other devices, the energy stored one the one or more portable energy storage devices is transferred to the corresponding other devices, at 370. In the one implementation, the electrical energy from one or more portable batteries is transferred to power an electronic or electromechanical device, such as a smart phone, portable music player, a cordless power tool and/or the like. In another implementation, the electrical energy from one or more portable batteries to a home energy network, for example to subsidize the household draw from a utility power distribution grid. In yet another implementation, the electrical energy from one or more portable batteries may be transferred to a utility power distribution grid in exchange for consideration such as money and/or credits. For instance, a portable battery may include a connector for coupling to a digital music player and a voltage regulator for stepping the portable battery potential down from 12 volts to 3 volts for powering the digital music player. In another example, a portable battery may include a connector for coupling to a home power network, while the home power network includes a power inverter for converting the 12 volt direct current supply from the portable battery to 120 volt alternating current for subsidizing the home power network's draw from the utility power distribution grid.

It is appreciated that the one or more portable energy storage devices may be recharged by coupling the portable energy storage devices to the vehicle and repeating process 310-370. For instance, a user may commute back and forth to work with few or no extra passengers or cargo throughout the week. During breaking the regenerative breaking system of the vehicle typically captures and converts more kinetic energy to electrical energy than the rate at which the vehicle's batteries can be recharged. In such case, the vehicle's cargo trunk, passenger compartment or other location may include one or more connectors for coupling portable batteries to the regenerative breaking system. Therefore, when the vehicle is not loaded with additional passenger or cargo, the user can add portable batteries to capture the converted electrical energy in excess of the primary battery's capacity for use in other devices. The user may re-charge the portable energy storage devices each day while commuting back and forth to work. When the user is at work or at home, the portable energy storage device may be used to power other devices. When space in the vehicle is needed to carry other cargo and/or passengers, for a vacation for instance, the user may forego charging the portable batteries to free up space for the other cargo and/or passengers.

Embodiments of the present technology advantageously capture kinetic energy from a vehicle's braking process, excess kinetic energy generated by the vehicle's engine, and/or the like. Embodiments advantageously convert the kinetic energy to another form of energy. Embodiments of the present technology then store the converted energy in a portable energy storage device for multi-purpose use in devices and locations separate from the vehicle.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A system comprising:
a portable energy storage device; and
a vehicle including:
a portable energy storage device port to removably couple the portable energy storage device to the vehicle;
a vehicle energy storage device; and
a kinetic energy capture system to capture and store kinetic energy of the vehicle in the vehicle energy storage device up to a rate of charge or a capacity of the vehicle energy storage device and in the portable energy storage device in excess of the rate of charge or the capacity of the vehicle energy storage device.

2. The system of claim 1, wherein the kinetic energy capture system comprises a regenerative braking system.

3. The system of claim 1, wherein:
the portable energy storage device comprises one or more portable batteries; and
the vehicle energy storage device comprises one or more vehicle batteries.

4. The system of claim 3, wherein the kinetic energy capture system comprises a generator to convert the kinetic energy of the vehicle into electrical energy.

5. The system of claim 4, wherein the kinetic energy capture system further comprises a motor for using energy stored in the one or more vehicle batteries to propel the vehicle.

6. The system of claim 1, wherein:
the portable energy storage device comprises one or more portable condensers; and
the vehicle energy storage device comprises one or more vehicle batteries.

7. The system of claim 6, wherein the kinetic energy capture system comprises a pump to convert the kinetic energy of the vehicle into compressed gas or liquid.

8. The system of claim 1, further comprising an engine.

9. The system of claim 8, wherein the kinetic energy capture system further captures and stores excess kinetic energy of the engine in the vehicle energy storage device up to a rate of charge or a capacity of the vehicle energy storage device and in the portable energy storage device in excess of the rate of charge or the capacity of the vehicle energy storage device.

10. The system of claim 1, further comprising:
a motor to propel the vehicle using energy stored in the one or more vehicle energy storage devices;
an engine; and
wherein the motor and engine are coupled in a series hybrid, parallel hybrid or series-parallel hybrid configuration.

11. The system of claim 1, further comprising another device including a portable energy storage device port to removably couple the portable energy storage device to the other device.

12. A system comprising:
a means for capturing kinetic energy of a vehicle;
a means for converting the kinetic energy of the vehicle to another form of energy;
a means for storing the converted energy in an energy storage device of the vehicle up to a rate of charge or a capacity of the energy storage device of the vehicle; and
a means for storing the converted energy in excess of the rate of charge or the capacity of the energy storage device of the vehicle in a portable energy storage device, the portable energy device being removable from the vehicle while still permitting the means for storing to store the converted energy in the energy storage device of the vehicle.

13. The system of claim 12, further comprising:
a means for decoupling the portable energy storage device from the vehicle after storing energy in the portable energy storage device;
a means for coupling the portable energy storage device to another device after decoupling from the vehicle; and
a means for transferring the energy stored on the portable energy storage device to the other device after coupling to the other device.

14. The system of claim 12, wherein the means for converting the kinetic energy of the vehicle to another form of energy comprises a means for converting motion of the vehicle to electrical energy.

* * * * *